Patented Oct. 17, 1939

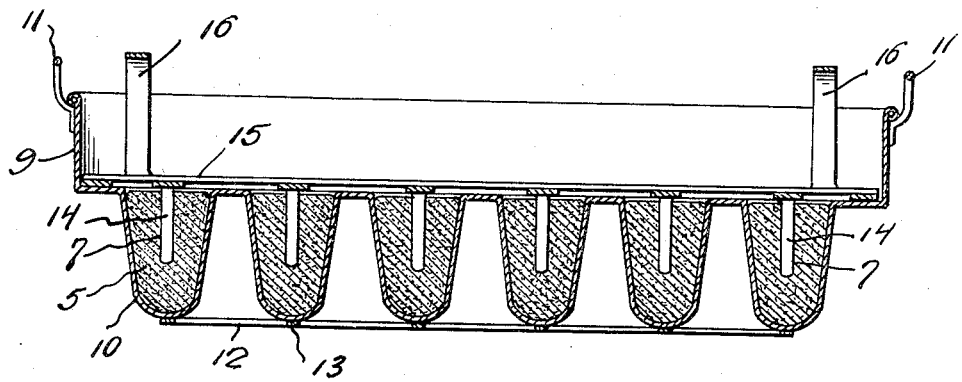
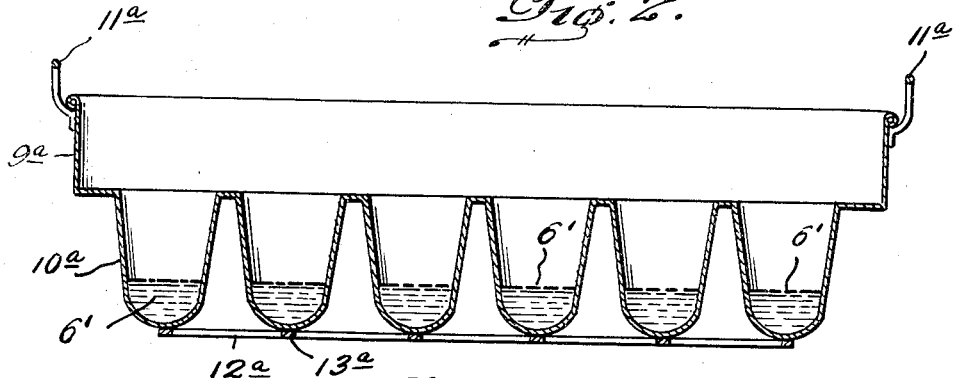
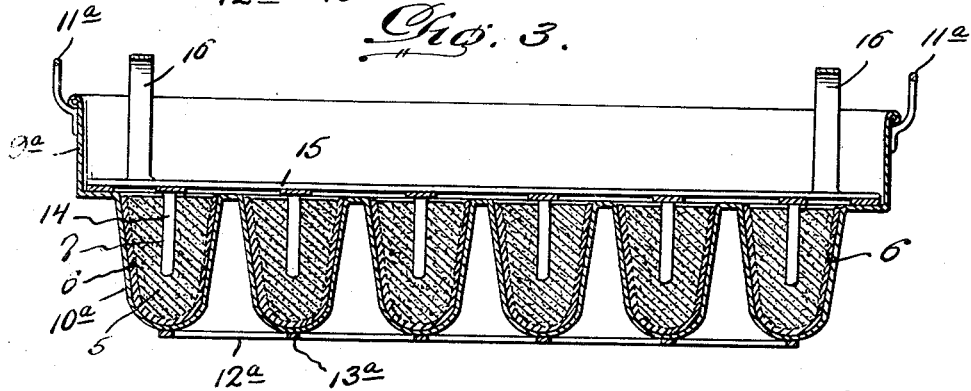

2,176,409

UNITED STATES PATENT OFFICE 2,176,409

MANUFACTURE OF FROZEN CONFECTIONS

Ezra Moroni Peterson, Ogden, Utah

Original application July 24, 1935, Serial No. 32,945. Divided and this application January 18, 1937, Serial No. 121,214

4 Claims. (Cl. 107—54)

This invention relates to the manufacture of frozen confections of that kind consisting of a body of ice-cream or like frozen liquid provided with a chocolate or like coating, and the present application is a division of my co-pending application Ser. No. 32,945, filed July 24, 1935, upon "Frozen confection and art of making the same".

In the manufacture of frozen confections of the above kind, as heretofore practiced, the ice-cream or like frozen bodies has been immersed or dipped in the chocolate or like coating substance, after which the coating was simply allowed to harden or congeal at normal temperatures on the ice-cream or other frozen body. Confections so made have been found objectionable for the reason that the coating melts very quickly, and cracks and readily flakes off of the ice-cream or like body, when the confection is being eaten or consumed.

An important object of the present invention, therefore, is to provide an improved process of making a confection of the above kind in which the coating is frozen onto the ice-cream or like body while pressed or confined against the latter, the coating being thereby firmly adhered or pressure-bonded directly to the body without the aid of mechanical bonding means, so that such coating will not melt quickly and will not readily crack and flake off of the ice-cream or like body while the confection is being eaten or consumed.

Another object of the present invention is to provide an improved process of and apparatus for making the improved confection described above.

The apparatus of the present invention includes a mold having a cavity conforming in shape to the shape of the ice-cream or like body to be coated, but of a size slightly larger than the size of such ice-cream or like body, and means for sustaining and centering said ice-cream or like body in the mold cavity, whereby, when the ice-cream or like body is centered into the mold cavity with a predetermined quantity of coating substance previously placed in such mold cavity, said coating substance will be forced upwardly on the sides of the ice-cream or like body to coat the latter. Thus, the coating substance will be confined against and forced into the material of the ice-cream or other frozen body at the surface of the latter for being effectively adhered or bonded to said ice-cream or like body when the latter and its coating is subsequently subjected to refrigeration while in the mold.

Other objects and features of the present invention will become apparent from the following description, when considered in connection with the accompanying drawing, in which:

Figure 1 is a central longitudinal sectional view of a device for molding the ice-cream or like bodies of a plurality of frozen confections, in carrying out the present invention.

Figure 2 is a central longitudinal sectional view showing the coating and molding device of the present invention with the coating substance deposited in the mold cavities of said device; and Figure 3 is a view similar to Figure 1, showing the molding and coating device of Figure 2 with the ice-cream or frozen bodies of Figure 1 inserted in the mold cavities of said coating and molding device, the ice-cream or like frozen bodies being carried by the sustaining means forming part of the device of Figure 1 and by means of which the ice-cream or like frozen bodies are centered in the mold cavities of said coating and molding device, and the coating substance being shown and forced upwardly on the sides of the ice-cream or like frozen bodies.

Referring more in detail to the drawing, the present invention is particularly illustrated in connection with the manufacture of frozen confections including an ice-cream or like frozen body 5 having a chocolate or equivalent coating 6 and provided with a central bore 7 in which may be inserted one end of a stick by means of which the confection may be conveniently held in a well known manner while being eaten or consumed.

In carrying out the present invention, apparatus is employed including a molding device of the type disclosed in my U. S. Letters Patent No. 1,881,965 granted October 11, 1932, upon "Apparatus for making frozen confections". As disclosed in this patent, such molding device is employed for molding a plurality of ice-cream or like frozen bodies 5, each of which is to form the body of a frozen confection of the kind above described. As generally illustrated in Figure 1, such molding device consists of a pan-like receptacle 9 having a plurality of molds 10 rigid with and depending from the bottom thereof, said molds opening into the receptacle 9 through openings in the bottom of the latter. The receptacle 9 is preferably provided with suitable end handles 11, and the molds 10 may be suitably connected and braced by longitudinal and transverse rods 12 and 13 secured to the bottoms of the molds. Obviously, the molds 10 are adapted to be filled with a liquid substance to be frozen therein whereby the frozen bodies 5 are produced.

Means is provided to sustain and simultaneously remove all of the frozen bodies 5 from the molds 10, and such means may consist of a plurality of fingers 14 rigid with and depending from a frame 15, said fingers 14 being arranged so that one of the same is centrally entered into each of the molds 10 when the frame 15 is placed within the receptacle 9 and upon the bottom of the latter. The frame 15 is of a size to snugly fit within the pan or receptacle 9, and has a pair of handles 16 to facilitate lifting and carrying of the same. This sustaining device for the frozen bodies is of course positioned in place within the receptacle 9 before the material in the molds 10 is frozen to form the bodies 5. Obviously, after the material in the molds 10 has been frozen to produce the bodies 5, the latter may be loosened from the walls of the molds by immersing the latter in warm water. The frozen bodies 5 may then all be lifted from the molds 10 by simply lifting the frame 15, said frozen bodies 5 remaining on the fingers 14.

Pursuant to the above described operation, the frame 15, with the attached frozen bodies 5 are transferred to a coating and molding device of the form shown in Figures 2 and 3, and consisting of a pan-like receptacle 9a having a plurality of molds 10a rigid with and depending from the bottom thereof, said molds opening into receptacle 9a through openings in the bottom of the latter. The receptacle 9a has end handles 11a and the molds 10a may be braced by rods 12a and 13a. The only essential difference between the construction of the receptacle and mold portions of the molding device of Figure 1 and the construction of the coating and molding device thus described, is that the molds 10a are slightly larger than the molds 10, so that when the frame 15, with the frozen bodies 5 on the fingers 14 of said frame 15, is inserted in the receptacle 9a and upon the bottom of the latter, the said frozen bodies 5 will be centered in and disposed in slight uniformly spaced relation to the walls of the cavities of said molds 10a. However, before the frame 15 with the attached frozen bodies 5 are transferred to the coating and molding device as thus described, the molds 10a of said coating and molding device have predetermined quantities of chocolate or other liquid coating material deposited therein as shown at 6' in Figure 2.

When the liquid coating substance has been deposited in the molds 10a as shown in Figure 2, the frame 15 with the attached frozen bodies 5 is placed in the molding and coating device as shown in Figure 3. As the frozen bodies 5 enter the molds 10a, the liquid coating substance previously deposited in said molds 10a is forced upwardly on the sides of the frozen bodies 5 so as to substantially completely coat the latter, the quantity of coating substance deposited in each mold 10a being just sufficient to substantially completely coat the frozen body positioned in that mold. The frozen bodies and the coatings thereof are then suitably subjected to refrigeration so that the coatings are frozen onto the bodies 5 while confined against the latter in the molds 10a for being effectively adhered or bonded to the latter. This is particularly important if the coating material is such that it is fluid at normal temperatures and must be congealed by refrigeration. This bonding effect is had because the coating substance is forced up the sides of the frozen bodies and confined thereagainst during the final freezing operation, and it will be apparent that the coatings will not readily melt and will not readily crack and flake off while the confection is being eaten or consumed.

After the coatings have been frozen on the frozen bodies 5 while in the molds 10a, such coated frozen bodies may be removed from the molds 10a by simply lifting them, together with the frame 15 out of the coating and molding device, the confections having been previously suitably loosened from the walls of molds 10a or by some means having been prevented from adhering to the latter. The coated frozen bodies are then removed from the fingers 14 and placed in suitable containers or wrappers, whereupon a handle-forming stick may be inserted in the cavity or bore 7 formed in each confection by one of the fingers 14. Thus, the limited amount of coating material is confined in the restricted space between the body portion 5 of the confection and the mold wall under hydrostatic pressure, said space conforming to the thickness of the coating and by subjecting the coating to refrigeration while it is maintained under this pressure, the coating is pressure-bonded, so to speak, to the main body portion of the confection.

From the foregoing description, it is believed that the nature and advantages of the present invention will be readily understood and appreciated by those skilled in the art. Also, while I have described what is at present believed to be the preferred embodiment of the present invention, it will be understood that minor changes may be made in the details thereof as illustrated and described, without departing from the spirit and scope of the invention as claimed.

What I claim as new is:

1. In a process of making confections composed of a main body portion of ice cream or like frozen material and a thin covering of a coating substance, the steps which consist of molding said body portion, inserting said body portion in a mold member, confining under pressure between said body and mold wall a quantity of coating substance only sufficient to form said thin covering, and subjecting said body and substance to refrigeration while maintaining said coating substance under pressure to form a pressure bond between said covering and body.

2. In a process of making confections composed of a main body portion of frozen ice cream or like material and a thin covering of coating substance, the steps which consist of molding said body portion, inserting said body in a container having an interior corresponding in shape to the form of said body, positioning said body in said container to form a restricted space between the surface of the body and the container, confining a quantity of coating substance under pressure in said restricted space, and subjecting the coating substance to refrigeration while maintaining the same under pressure to form a pressure bond between said coating and body.

3. In a process of making confections composed of a body portion of ice cream or like frozen material and a thin covering of a coating material, the steps which consist of molding the body of ice cream or like material, inserting said body in a mold member having coating material therein, said coating material being confined in a space between the wall of the mold and the surface of said body to obtain a pressure bonding of the coating on said body, the space in which the coating material is confined corresponding in width to the thickness of the coating formed on said body and subjecting said body and confined coating material to refrigeration.

4. In a process of making confections composed of a body of ice cream or like frozen material and a thin coating of edible substance, the steps which consist in molding the body of ice cream or like material, confining said body together with a quantity of coating substance only sufficient to form a thin coating of the desired thickness in a receptacle with said body spaced from the wall of said receptacle a distance corresponding to the desired thickness of the coating, said space being filled with said coating substance, and subjecting said confined body and coating substance to refrigeration, there being pressure on the confined coating substance to effect a pressure bonding of said coating and body.

EZRA MORONI PETERSON.